(12) United States Patent
Zhou et al.

(10) Patent No.: US 10,404,796 B2
(45) Date of Patent: Sep. 3, 2019

(54) METHOD AND SYSTEM FOR INFORMATION TRANSFER AND SHARING AMONG MOBILE APPARATUSES

(71) Applicant: HUIZHOU TCL MOBILE COMMUNICATION CO., LTD., HuiZhou, Guangdong (CN)

(72) Inventors: Baozhong Zhou, HuiZhou (CN); Hui Zhu, HuiZhou (CN); Yuxin Su, HuiZhou (CN)

(73) Assignee: HUIZHOU TCL MOBILE COMMUNICATION CO., LTD., HuiZhou, Guangdong (CN)

( * ) Notice: Subject to any disclaimer, the term of this patent is extended or adjusted under 35 U.S.C. 154(b) by 411 days.

(21) Appl. No.: 14/779,449

(22) PCT Filed: Jul. 17, 2014

(86) PCT No.: PCT/CN2014/082378
§ 371 (c)(1),
(2) Date: Sep. 23, 2015

(87) PCT Pub. No.: WO2015/165150
PCT Pub. Date: Nov. 5, 2015

(65) Prior Publication Data
US 2016/0156713 A1    Jun. 2, 2016

(30) Foreign Application Priority Data
Apr. 30, 2014   (CN) .......................... 2014 1 0180034

(51) Int. Cl.
*H04L 29/08*    (2006.01)
*H04L 12/24*    (2006.01)
*H04W 8/24*    (2009.01)

(52) U.S. Cl.
CPC .......... *H04L 67/1095* (2013.01); *H04L 41/20* (2013.01); *H04L 67/04* (2013.01); *H04L 67/2823* (2013.01); *H04W 8/24* (2013.01)

(58) Field of Classification Search
CPC ............ H04N 21/4307; H04L 67/1095; H04L 65/607; H04L 67/20; H04L 67/2823;
(Continued)

(56) References Cited

U.S. PATENT DOCUMENTS 8,458,128 B2 *   6/2013   Khosravy ............. G06F 16/273
                                                      707/621
8,825,362 B2 *   9/2014   Kirsch ................. G01C 21/362
                                                      701/33.4
(Continued)

FOREIGN PATENT DOCUMENTS

| CN | 102567263 A | 7/2012 |
| CN | 102708125 A | 10/2012 |
| CN | 103927288 A | 7/2014 |

OTHER PUBLICATIONS

Filter and import mobile contacts—Google Patent Search—Jun. 21, 2017.*
(Continued)

*Primary Examiner* — Philip J Chea
*Assistant Examiner* — Ruth Solomon
(74) *Attorney, Agent, or Firm* — Ladas & Parry LLP

(57) ABSTRACT

A method and a system for information transfer and sharing among mobile apparatuses are disclosed. The method includes the steps of identifying and displaying data in each mobile apparatus as well as simultaneously indicating each name of each mobile apparatus on an endpoint PC when at least two mobile apparatuses are connected to the endpoint PC; transferring or synchronizing the data in a designated mobile apparatus to or with a destination mobile apparatus when an instruction for data transfer or data synchronization
(Continued)

is received. The present invention can fulfill information transfer and sharing among multiple mobile apparatuses.

6 Claims, 6 Drawing Sheets

(58) Field of Classification Search
CPC ..... H04L 67/141; H04L 67/42; H04L 1/1887;
H04L 65/604; H04L 63/123; G06F
17/30174; G06F 17/30575; G06F 21/50;
G06F 17/30056; G06F 17/30893; H04W
56/001; H04W 88/02; H04W 64/00;
H04W 8/005; H04W 72/02; H04W 8/24;
H04W 4/18; H04W 76/10; H04W 92/18;
H04W 4/70
USPC .................................................. 715/235, 249
See application file for complete search history.

(56) References Cited

U.S. PATENT DOCUMENTS

| | | | | |
|---|---|---|---|---|
| 8,966,383 | B2* | 2/2015 | Gautier | H04W 8/265 |
| | | | | 715/764 |
| 9,307,006 | B2* | 4/2016 | Micucci | H04L 67/02 |
| 9,654,897 | B1* | 5/2017 | Macaluso | G06F 8/63 |
| 2008/0167027 | A1* | 7/2008 | Gautier | H04W 8/265 |
| | | | | 455/419 |
| 2009/0282057 | A1* | 11/2009 | Thomas | G06F 17/30038 |
| 2010/0057785 | A1* | 3/2010 | Khosravy | G06F 16/273 |
| | | | | 707/E17.005 |
| 2011/0225365 | A1 | 9/2011 | Fruchter et al. | |
| 2012/0117558 | A1* | 5/2012 | Futty | G06F 8/61 |
| | | | | 717/176 |
| 2012/0197523 | A1* | 8/2012 | Kirsch | G01C 21/362 |
| | | | | 701/426 |
| 2012/0197998 | A1* | 8/2012 | Kessel | G06Q 10/10 |
| | | | | 709/205 |
| 2012/0240078 | A1* | 9/2012 | Kung | G06F 17/30174 |
| | | | | 715/781 |
| 2012/0289195 | A1* | 11/2012 | Yu | H04L 63/0428 |
| | | | | 455/411 |
| 2013/0073965 | A1* | 3/2013 | Sik | G06F 17/241 |
| | | | | 715/730 |
| 2013/0144692 | A1* | 6/2013 | Shalabi | G06F 17/217 |
| | | | | 705/14.4 |
| 2013/0145258 | A1* | 6/2013 | Reilly | G06F 17/30905 |
| | | | | 715/249 |
| 2013/0275509 | A1* | 10/2013 | Micucci | H04L 67/02 |
| | | | | 709/204 |
| 2014/0059424 | A1* | 2/2014 | Kim | G06F 17/212 |
| | | | | 715/235 |
| 2014/0103104 | A1* | 4/2014 | Jover | H04N 21/4126 |
| | | | | 235/375 |
| 2014/0315489 | A1* | 10/2014 | Lee | G06F 3/1454 |
| | | | | 455/41.2 |
| 2014/0330928 | A1* | 11/2014 | Takehara | H04L 67/1095 |
| | | | | 709/217 |
| 2014/0359481 | A1* | 12/2014 | Dawson | G06Q 10/10 |
| | | | | 715/753 |
| 2015/0082148 | A1* | 3/2015 | Lai | G06F 17/214 |
| | | | | 715/235 |

OTHER PUBLICATIONS

Use pc display to synchronize between mobile devices displays—Google Patent Search—Jun. 21, 2017.*
Use PC to synchronize plurality of mobile devices displays—Google Patent Search—Jun. 21, 2017.*
Use PC to synchronize mobile devices displays—Google Patent Search—Jun. 21, 2017.*
Cassavoy, Liane. "Wondershare MobileTrans Review: Windows utility makes phone upgrades a lot easier" (2013) https://www.pcworld.com/article/2062784/wondershare-nnobiletrans-review-windowsutility-makes-phone-upgrades-a-lot-easier.html (Year: 2013).*
Wondershare MobileTrans—One Click Phone Transfer for Android, Symbian & iOS YouTube video, published Nov. 28, 2012. https://www.youtube.com/watch?v=T7B4EASgxIQ (Year: 2012).*

* cited by examiner

METHOD AND SYSTEM FOR INFORMATION TRANSFER AND SHARING AMONG MOBILE APPARATUSES

BACKGROUND OF THE INVENTION

Field of the Invention

The present invention relates to the field of information management and synchronization, and more particularly to method and system for information transfer and sharing among mobile apparatuses.

Description of Prior Art

With the rapid development of various mobile apparatuses such as cell phones or PDAs (Personal Digital Assistants), there has been a variety of mobile terminal products on the market as well as all kinds of software tools to manage mobile apparatuses. Along with the continuous development and improvement of the mobile internet, people have gradually entered the era of mobile internet. The amount of Information which people need is increasing and the stored information is getting larger and larger. At the same time, a single person owns increasingly more mobile apparatuses along with the improvement of living quality. However, the current product for managing mobile apparatuses provides a simple information management only aiming at a single mobile apparatus, for example, the information update is operated for a single mobile apparatus, but the information transfer and sharing among multiple mobile apparatuses cannot be performed Thus, there is a need of improving and further developing the existing technique.

SUMMARY OF THE INVENTION

In view of the deficiency of the conventional technology described above, an objective of the present invention is to provide a method and a system for information transfer and sharing among mobile apparatuses to solve a problem that cannot perform information transfer and sharing among multiple mobile apparatuses in the present software for management of mobile apparatuses.

The technical solutions of the present invention are as follows:

A method for information transfer and sharing among mobile apparatuses according to a preferred embodiment of the present invention, the method comprising the steps of:

identifying and displaying data in each mobile apparatus by means of display modules on a display interface of an endpoint PC as well as simultaneously indicating each name of each mobile apparatus after at least two mobile apparatuses including a designated mobile apparatus and a destination apparatus have been connected to the endpoint PC and the data in each mobile apparatus has been obtained by the endpoint PC;

determining whether a format of the data in the designated mobile apparatus to be transferred or synchronized is different from the that of the data in the destination mobile apparatus firstly when an instruction for data transfer or data synchronization is received, wherein if the two formats have a difference, the format of the data in the designated mobile apparatus is converted into a saved format in the destination mobile apparatus, and otherwise, the next step is executed;

transferring or synchronizing the data in the designated mobile apparatus to or with the destination mobile apparatus.

In the above method for information transfer and sharing among mobile apparatus, the mobile apparatuses correspond to the display modules one-to-one, and each display module saves the data in the corresponding mobile apparatus.

In the above method for information transfer and sharing among mobile apparatuses, the data comprises multimedia, contacts, and SD card documents.

A method for information transfer and sharing among mobile apparatuses according to another preferred embodiment of the present invention, the method comprising the steps of:

identifying and displaying data in each mobile apparatus by an endpoint PC as well as simultaneously indicating each name of each mobile apparatus when at least two mobile apparatuses are connected to the endpoint PC;

transferring the data in a designated mobile apparatus to a destination mobile apparatus when an instruction for data transfer is received; and synchronizing the data in a designated mobile apparatus with a destination mobile apparatus when an instruction for data synchronization is received.

In the above method for information transfer and sharing among mobile apparatuses, the step of identifying and displaying data in each mobile apparatus on an endpoint PC as well as simultaneously indicating each name of the each mobile apparatus when at least two pieces of the mobile apparatuses are connected to the endpoint PC further comprises:

displaying data in each mobile apparatus by means of display modules as units on a display interface of the endpoint PC after the data in the each mobile apparatus has been obtained by the endpoint PC, the mobile apparatuses corresponding to the display modules one-to-one.

In the above method for information transfer and sharing among mobile apparatuses, the step of transferring the data in a designated mobile apparatus to a destination mobile apparatus when an instruction for data transfer is received further comprises:

determining whether a format of the data in a designated mobile apparatus to be transferred is different from that of the data in the destination mobile apparatus;

converting the format of the data in the designated mobile apparatus into a saved format in the destination mobile apparatus if the two formats have a difference; and transferring and importing the converted data into the destination mobile apparatus.

In the above method for information transfer and sharing among mobile apparatuses, the step of synchronizing the data in a designated mobile apparatus with a destination mobile apparatus when an instruction for data synchronization is received further comprises:

determining whether a format of the data in a designated mobile apparatus to be transferred is different from that of the data in the destination mobile apparatus;

converting the format of the data in the designated mobile apparatus into a saved format in the destination mobile apparatus if the two formats have a difference; and filtering out a duplicate data in the format-converted data; and importing the filtered data into the destination mobile apparatus.

In the above method for information transfer and sharing among mobile apparatuses, the data comprises multimedia, contacts, and SD card documents.

A system for information transfer and sharing among mobile apparatuses according to another preferred embodiment of the present invention, the system comprising:

an information attainment module, configured to identify and display data in each mobile apparatus as well as simultaneously indicate a name of each mobile apparatus when at least two mobile apparatus are connected to an endpoint PC; and an information transfer module, configured to transfer the data in a designated mobile apparatus to a destination mobile apparatus when an instruction for data transfer is received, or synchronize the data in a designated mobile apparatus with the data in a destination mobile apparatus when an instruction for data synchronization is received.

In the above system for information transfer and sharing among mobile apparatuses, the information obtainment module further comprises:

a display unit, configured to display the data in the each mobile apparatus by means of display modules on a display interface of the endpoint PC after the endpoint PC has obtained the data in the each mobile apparatus, and it is one-to-one correspondence among the mobile apparatuses and the display modules;

an identification unit, configured to indicate a name of the each mobile apparatus in the display modules.

In the above system for information transfer and sharing among mobile apparatuses, the information transfer module further comprises:

a movement unit, configured to determine whether a format of the data in a designated mobile apparatus to be transferred is different from that of the data in a destination mobile apparatus when the instruction for data transfer is received, and if the two formats have a difference, convert the format of the data in the designated mobile apparatus into a saved format in the destination mobile apparatus as well as transfer and import the format-converted data info the destination mobile apparatus.

In the above system for information transfer and sharing among mobile apparatuses, the information transfer module further comprises:

a synchronization unit, configured to determine whether a format of the data in a designated mobile apparatus to be synchronized is different from that of the data in a destination mobile apparatus when the instruction for data synchronization is received, and if the two formats have a difference, convert the format of the data in the designated mobile apparatus into a saved format in the destination mobile apparatus as well as filter out a duplicate data in the format-converted data and importing the filtered data into the destination mobile apparatus.

In the above system for information transfer and sharing among mobile apparatuses, the data comprises multimedia, contacts, and SD card documents.

The advantage of the present invention is that an endpoint PC is simultaneously connected with multiple mobile apparatuses and obtains data in each of the mobile apparatus, and the data in a designated mobile apparatus is transferred to or synchronized with a destination mobile apparatus according to an instruction for data transfer or an instruction for data synchronization requested by an user to fulfill information transfer and sharing among multiple mobile apparatuses.

DETAILED DESCRIPTION OF THE INVENTION

The present invention provides a method and a system for information transfer and sharing among multiple mobile apparatuses, and it is described below in further detail for the purposes of making the objective, technical solutions, and the effect of the present invention more clear and specific. It should be understood that the specific embodiments described herein are only for explaining the present invention and are not intended to limit the present invention.

Figure 1:
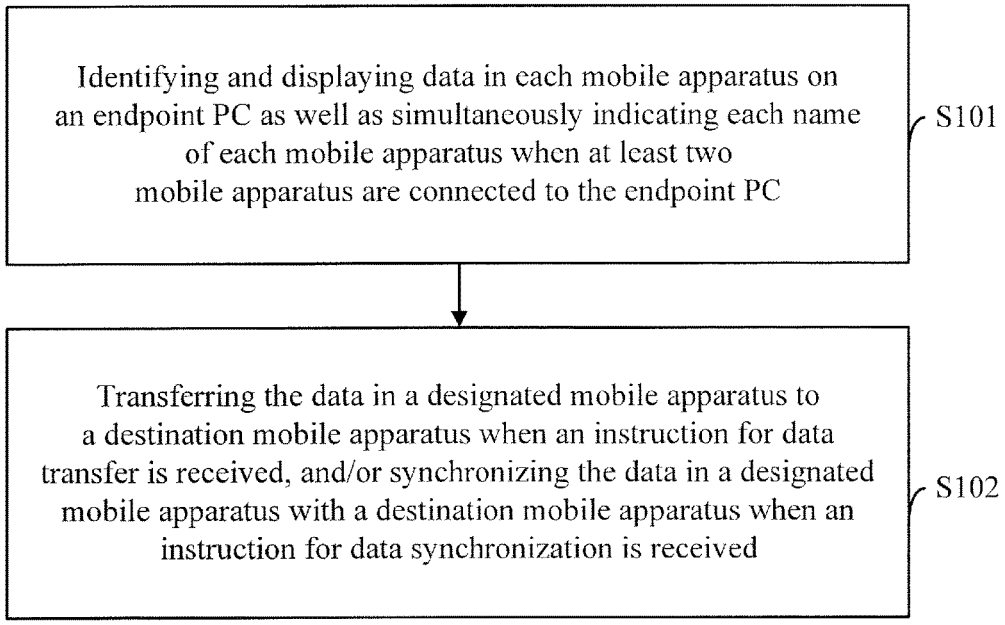
FIG. 1 shows a flowchart of a method for information transfer and sharing among apparatuses according to a preferred embodiment of the present invention.

Refer to FIG. 1, which shows a flowchart of a method for information transfer and sharing among mobile apparatuses according to a preferred embodiment of the present invention. As shown in FIG. 1, the method comprises the steps of:

S101: When at least two mobile apparatuses are connected to an endpoint PC (personal computer), each mobile apparatus is identified and data in the each mobile apparatus is displayed by the endpoint PC, and simultaneously each mobile apparatus is indicated with a name.

S102: When an instruction for data transfer is received, the data in the designated mobile apparatus is transferred to a destination mobile apparatus, and/or when an instruction for data synchronization is received, the data in the designated mobile apparatus is synchronized with the destination mobile apparatus.

In this embodiment, firstly at least two mobile apparatuses are connected to the endpoint PC (endpoint computer), and a connection method may be a USB connection, a wireless connection, a Bluetooth connection, or other existing connections. After the at least two pieces of mobile apparatuses are connected to the endpoint PC, each connected mobile apparatus is identified, and the data in each mobile apparatus is obtained and then displayed. The data includes multimedia, contacts, and SD card documents. The multimedia includes music, pictures, photos, and videos and other multimedia files. The contacts include various information such as contact names, telephone numbers, addresses in a contact address book and so on. The SD card documents refer to the files stored on a SD card which is externally inserted in the mobile apparatus. Of course, the data may also include other information such as applications installed on the mobile apparatus, short messages on the mobile apparatus, and other data in the mobile apparatus. After the mobile apparatuses are connected to the endpoint PC, the endpoint PC can obtain these data so that the data can be operated by users such as an operation for data transfer or synchronization. It should be noted that this embodiment can also save the information in the endpoint PC, so the saved data can be transferred to or synchronized with other mobile apparatuses without need of connecting with the mobile apparatuses later on. At the same time, the endpoint PC indicates its name of each mobile apparatus, and the name of each mobile apparatus is defined, for example, the mobile apparatus is named by using a model number to facilitate the user identifying each mobile apparatus.

After the mobile apparatuses are connected to the endpoint PC, data in each mobile apparatus can be transferred and synchronized by the user who operates the endpoint PC, for example, when the instruction for data transfer is received, the data in the designated mobile apparatus is transferred to the destination mobile apparatus. The means of transfer may be a cutting means, and it may be a copying means. When the instruction for data synchronization is received, the data in the designated mobile apparatus is synchronized with the destination mobile apparatus. As such, data can be delivered among the mobile apparatuses.

Therefore, the information transfer and delivery among all mobile apparatuses can be realized by simply using a single PC. In this manner, when the mobile apparatus, e.g. mobile phone, is changed by the user, it is convenient to synchronize the stored information in the mobile apparatus or other types of information with another mobile apparatus (e.g. a new mobile phone) so that a fast and accurate data transfer and synchronization can be fulfilled.

In addition, a detection module is provided, and the detection module can compare the data in each mobile apparatus connected to the endpoint PC, and determines whether the selected data in each mobile apparatus is the same, if not identical, the user will be reminded to perform an operation for data transfer or data synchronization. The detection module can be triggered when a new mobile apparatus is connected to the endpoint PC, and a re-testing is run every period of time, for example, every one hour, to facilitate user data synchronization and the like in real time.

Figure 2:
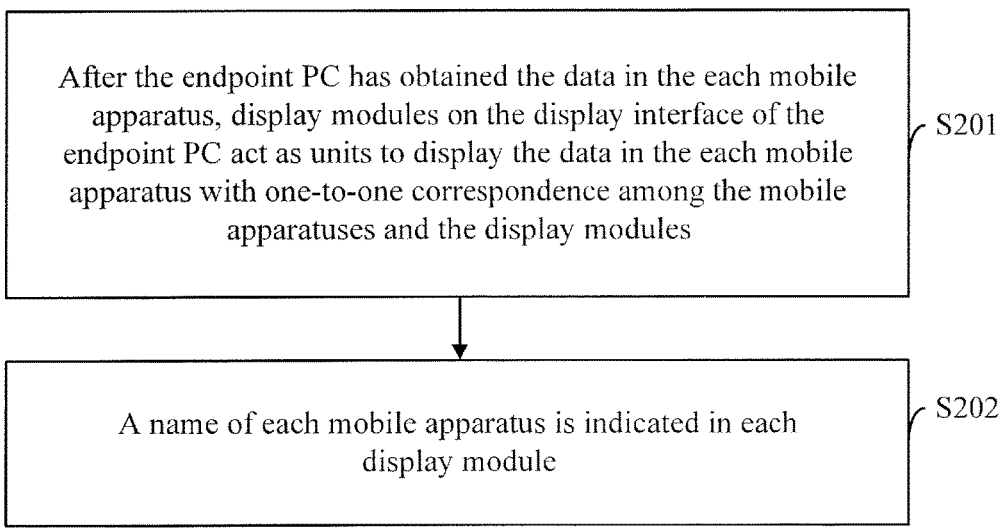
FIG. 2 shows a specific flowchart of step S101 of the method illustrated in FIG. 1.

A preferred embodiment of the present invention is illustrated, and the step S101, as shown in FIG. 2, includes:

S201: After the endpoint PC has obtained the data in the each mobile apparatus, display modules on the display interface of the endpoint PC act as units to display the data in the each mobile apparatus with one-to-one correspondence among the mobile apparatuses and the display modules.

After the endpoint PC has obtained the data in the each mobile apparatus, the display modules on the display interface of the endpoint PC act as units to display the data in the each mobile apparatus. Multiple display modules are provided on the display interface of the endpoint PC, and each of the display modules occupies a display area. Each display area is configured to display the data, e.g. contacts, multimedia, etc., in each corresponding mobile apparatus.

Figure 3:
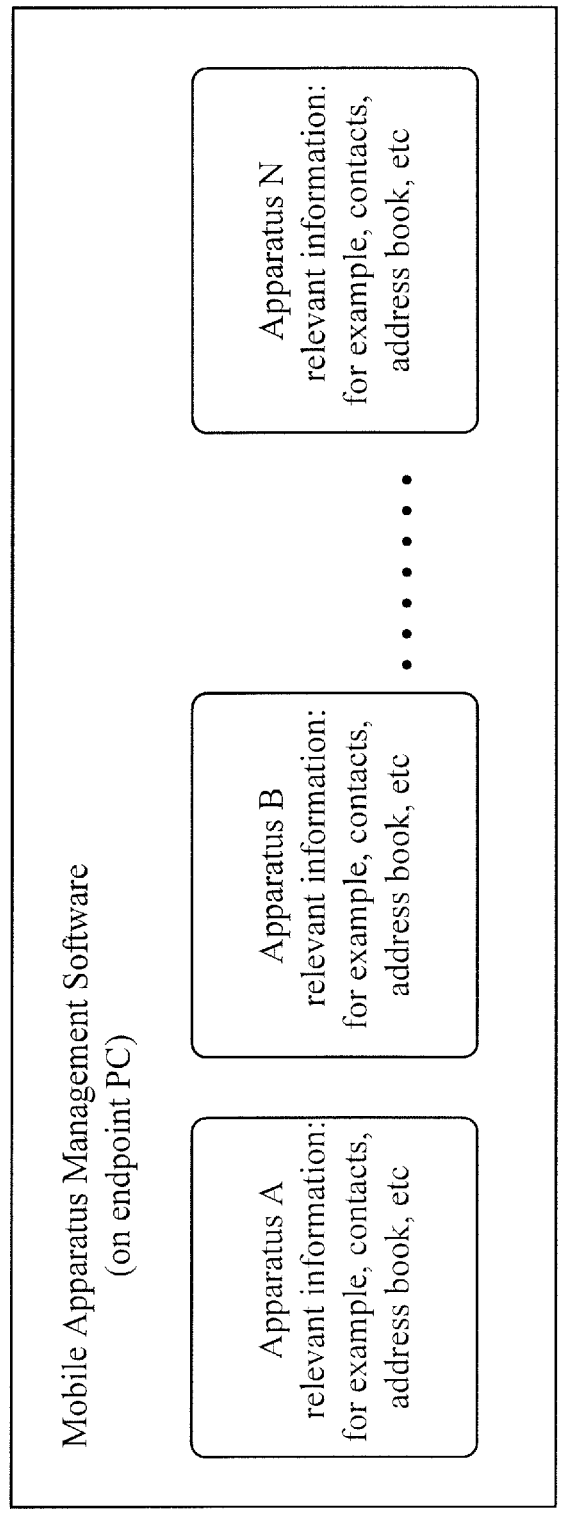
FIG. 3 shows a schematic diagram of the display interface on the endpoint computer according to the present invention when a mobile apparatus has been connected to the computer.

As shown in FIG. 3, each display area is represented with a rectangular box, within which the data in the corresponding mobile apparatus is indicated, for example, apparatus A, the relevant information is, for example, contacts, address book, etc., and other types of data can also be displayed. Mobile apparatus management software installed on the endpoint PC is an implementation of the present invention. Preferably, since the display interface on the endpoint PC is limited and it is difficult to display all of the information, the data in each mobile apparatus is just displayed in a list form to show categories of data. As a result, only the category is displayed, e.g. multimedia, contacts, SD card files, and each category will be displayed in a list form.

S202, a name of each mobile apparatus is indicated in each display module.

Preferably, the indicated name of the each mobile apparatus may be displayed in the upper position of the corresponding display area to allow the user to understand each mobile apparatus at a glance, such as shown in the diagram in FIG. 3, Apparatus A, Apparatus B, . . . , Apparatus N indicated on each display area. After the data in the each mobile apparatus is displayed by a display module which acts as a unit to display, the user can easily view what information is included in each mobile apparatus in order to perform operations such as moving or synchronization.

In addition, it is preferable that each display module also saves the data of the corresponding mobile apparatus and simultaneously nodes are arranged to receive instructions for data transfer or data synchronization. The endpoint PC offers two modes, in which one is a data transfer mode and another is a data synchronization mode, and the indication of these two modes can be displayed on top of the PC display interface. Furthermore, the user can switch the two modes by clicking on the logo, and the mode which is working at this moment can be displayed on the top of the display interface. For the data transfer mode, when the user clicks a corresponding display module of the designated mobile apparatus and slides to a display module corresponding to a destination mobile apparatus, the data saved in the display module corresponding to the designated mobile apparatus is transferred to the display module corresponding to the destination mobile apparatus, and at the same time the data is imported into the destination mobile apparatus through the display module corresponding to the destination mobile apparatus. For the data synchronization mode, when the user clicks to designate a display module corresponding to the mobile apparatus and slides to a display module corresponding to a destination mobile apparatus, the data saved in the designated display module corresponding to the mobile apparatus is synchronized with the display module corresponding to the destination mobile apparatus, and at the same time the data is imported into the destination mobile apparatus through the display module corresponding to the destination mobile apparatus.

Preferably, an arrow is shown during the data transfer or import process, and a direction of the arrow represents a direction of data transfer or synchronization, along with a progress bar on the arrow to display the data transfer or synchronization progress, thereby allowing the user to clearly view process of the data transfer or synchronization and consequently facilitate the user in time management.

In the preferred embodiment of the present invention, the step S102 specifically includes:

When the instruction for data transfer is received, it is determined whether a format of the data in the designated mobile apparatus to be transferred is different from that of the data in the destination mobile apparatus. If the two formats have a difference, the format in the designated mobile apparatus is converted into a saved format in the destination mobile apparatus. Then, the converted data in the designated mobile apparatus is transferred and imported into the destination mobile apparatus.

Upon receiving the instruction for data transfer requested by the user, firstly the data stored in the display module corresponding to the designated mobile apparatus is transferred to the display module corresponding to the destination mobile apparatus, if the two formats have a difference between the two mobile apparatus, for example, the contacts may be saved in a different format in different apparatus. Firstly, the format of the data is required to be converted; that is, the data in the designated mobile apparatus is converted into the saved format of the destination mobile apparatus, and then the converted data is imported into the display module of the destination mobile apparatus. If the display module of the destination mobile apparatus has already contained the data, three promptings are given: transfer and overwriting, transfer but not overwriting, and transfer cancelled that allow the user to choose whether data transfer is conducted. During the process of importing into the destination mobile apparatus, a prompting is given to prompt that there is not sufficient storage space in the destination mobile apparatus when an insufficient storage space in the destination mobile apparatus is found. As such, the user is allowed to perform an editing operation.

Figure 4:
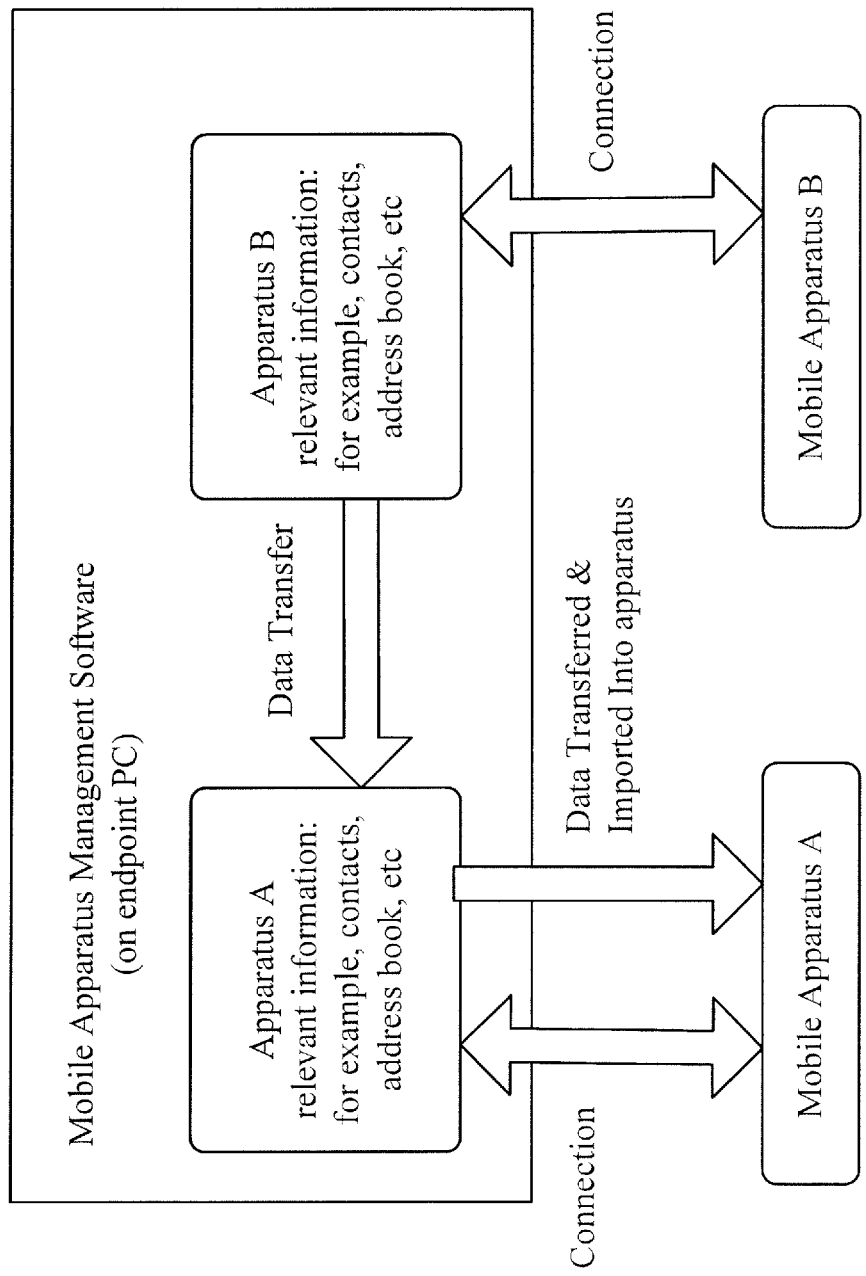
FIG. 4 shows a schematic diagram of the display interface on the endpoint computer according to the method of the present invention when data is transferring.

As shown in FIG. 4, when the user needs to transfer the data in the apparatus B (mobile apparatus B) to the apparatus A (mobile apparatus A), firstly the data in the display module corresponding to the apparatus B is transferred to the display module corresponding to the apparatus A, and then the data is imported into the apparatus A (mobile apparatus A) through the display module corresponding to the apparatus A.

In the preferred embodiment of the present invention, the step S102 specifically further includes:

When the instruction for data synchronization is received, it is determined whether a format of the data in the designated mobile apparatus to be synchronized is different from that of the data in the destination mobile apparatus, if the two formats have a difference, the format of the data in the designated mobile apparatus is converted into the saved format in the destination mobile apparatus. Then, the duplicate data is filtered out and the filtered data is imported into the destination mobile apparatus.

Upon receiving the instruction for data synchronization requested by the user, firstly the data stored in the display module of the designated mobile apparatus is synchronized to a display module of the destination mobile apparatus. If the format of the data to be synchronized has a difference between the two mobile apparatuses, for example, the contacts may be saved in a different format in a different apparatus. Firstly, a format of the data is required to be converted; that is, the format of the data is converted into the saved format in the destination mobile apparatus, and then the converted data is synchronized and imported into the display module of the destination mobile apparatus. Furthermore, the data in the designated mobile apparatus which is a duplicate data in the destination mobile apparatus is filtered out, and then the filtered data is imported into the destination mobile apparatus. If an insufficient storage space in the destination mobile apparatus is found during the process of importing into the destination mobile apparatus, a prompting is given to prompt that there is not sufficient storage space in the destination mobile apparatus, so that the user is allowed to perform an editing operation.

Figure 5:
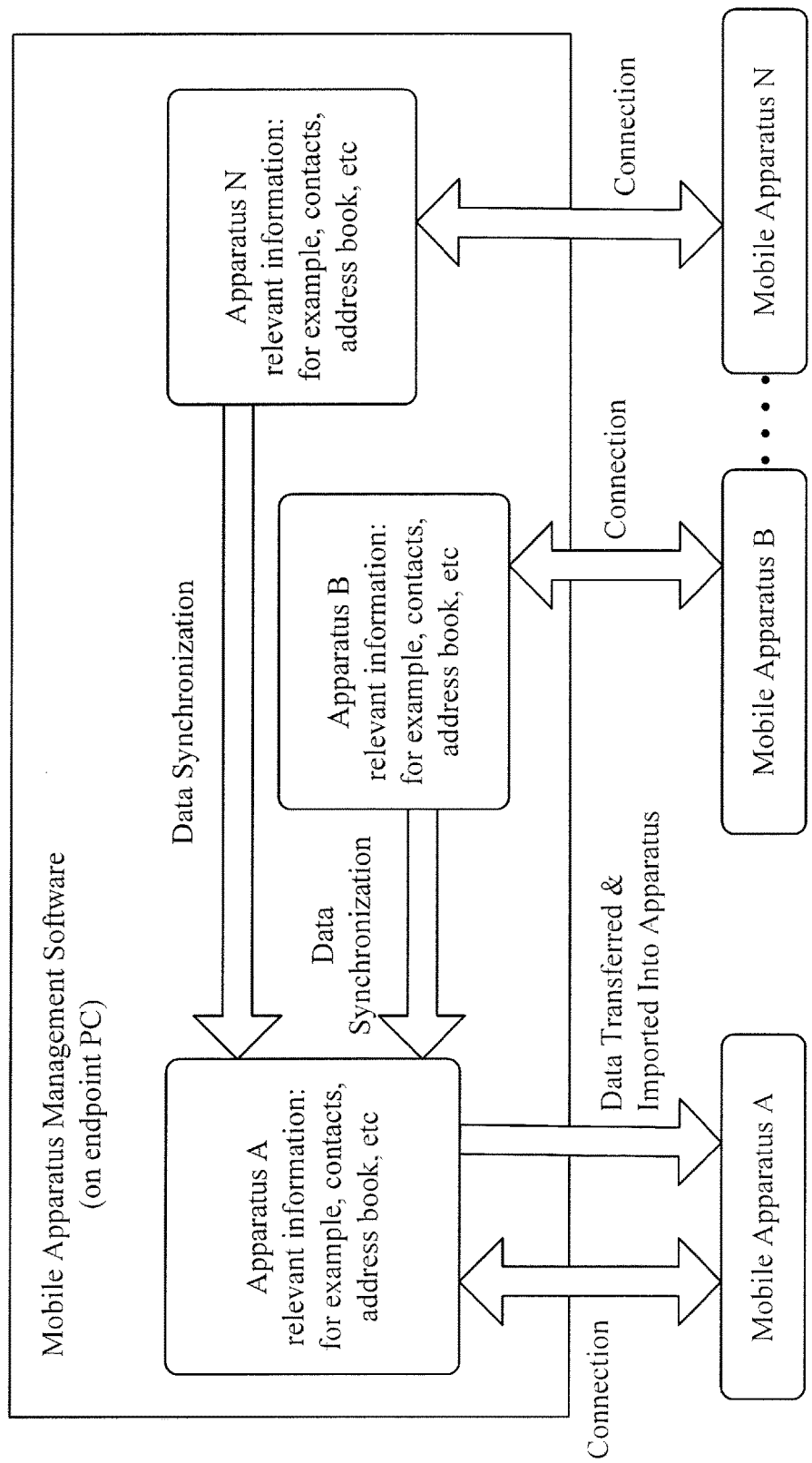
FIG. 5 shows a schematic diagram of the display interface on the endpoint computer according to the method of the present invention when data is synchronized.

As shown in FIG. 5, when the user needs to synchronize the data in the apparatus N (mobile apparatus N) or the apparatus B (mobile apparatus B) with the apparatus A (mobile apparatus A), firstly the data in the display module corresponding to the apparatus N or the data in the display module corresponding to the apparatus B is synchronized with the display module corresponding to the apparatus A, and then the data is imported into the apparatus A (mobile apparatus A) through the display module corresponding to the apparatus A.

The operation for data synchronization may synchronize the data in a mobile apparatus with the data in one or more mobile apparatus. For example, data in a mobile apparatus is imported into two mobile apparatuses.

Figure 6:
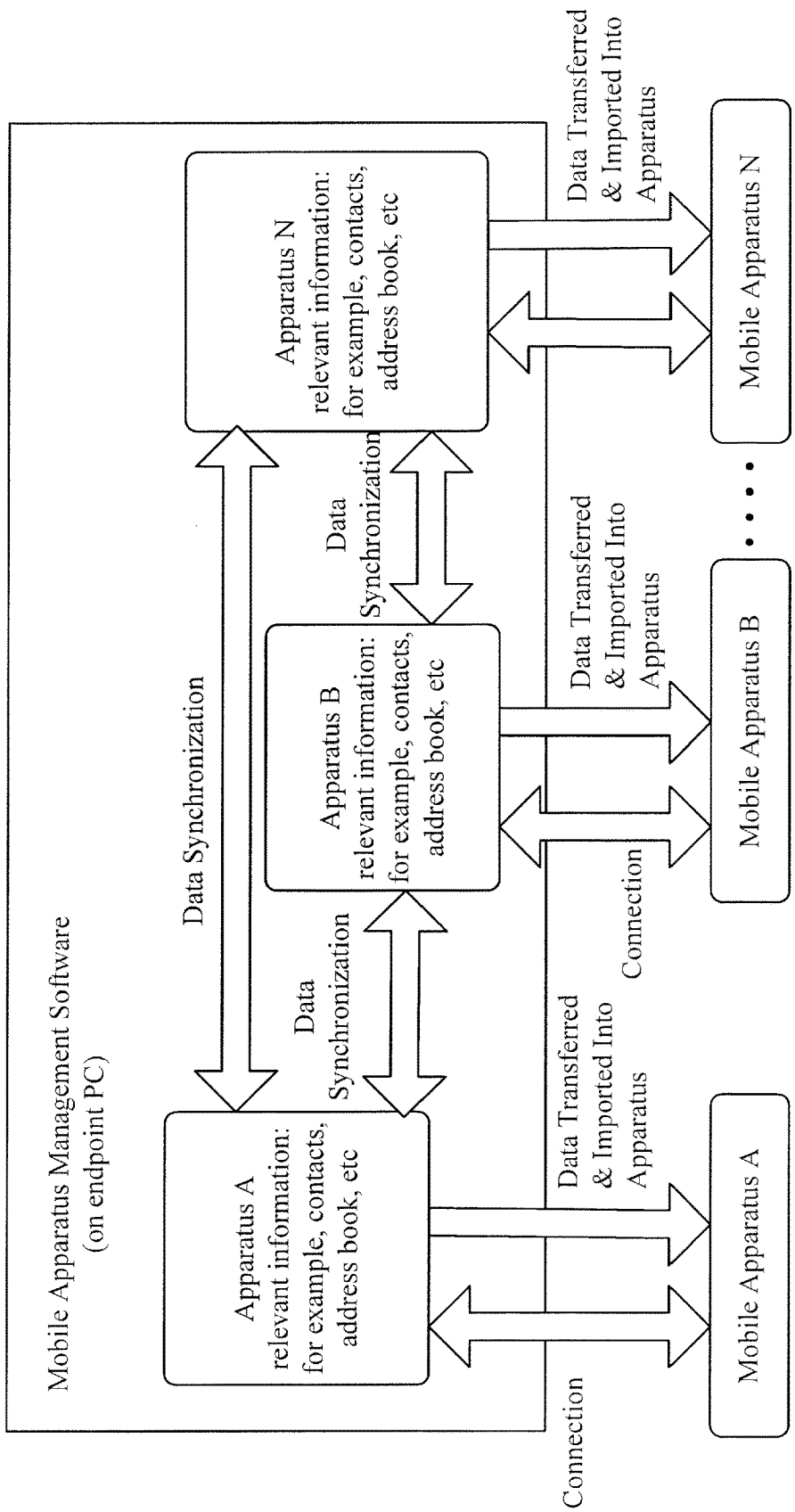
FIG. 6 shows a schematic diagram of the display interface on the endpoint computer according to the method of the present invention when one-button data synchronization is performed.

The present invention also provides an one-button synchronization method for implementing one-button synchronization function, as shown in FIG. 6, and the endpoint PC data can synchronize the data in all connected mobile apparatuses and the synchronized data are respectively imported into all connected mobile apparatuses. If the formats of the data to be synchronized have a difference between the two mobile apparatuses, for example, the contacts may be saved in a different format in a different apparatus. Firstly, a format of the data is required to be converted; that is, the format is converted into a saved format in the destination mobile apparatus, and then the converted data is synchronized with and imported into the display module of the destination mobile apparatus. Furthermore, the data in the designated mobile apparatus which is a duplicate data in the destination mobile apparatus is filtered out, and then the filtered data is imported into the destination mobile apparatus. If an insufficient storage space in the destination mobile apparatus is found during the process of importing into the destination mobile apparatus, a prompting is given to prompt that there is not sufficient storage space in the destination mobile apparatus, so that the user is allowed to perform an editing operation.

Figure 7:
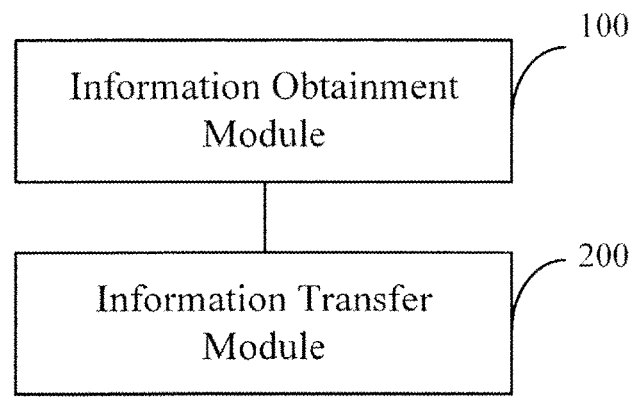
FIG. 7 shows a block diagram of a system for information transfer and sharing among apparatuses according to a preferred embodiment of the present invention.

Based on the above method, the present invention also provides a system for information transfer and sharing among mobile apparatuses according to a preferred embodiment of the present invention, as shown in FIG. 7, which comprises:

an information obtainment module 100, configured to identify and display data in each mobile apparatus as well as simultaneously indicate a name of each mobile apparatus when at least two mobile apparatuses are connected to an endpoint PC; and an information transfer module 200, configured to transfer the data in a designated mobile apparatus to a destination mobile apparatus when an instruction for data transfer is received, or synchronize the data in a designated mobile apparatus with the data in a destination mobile apparatus when an instruction for data synchronization is received.

Figure 8:
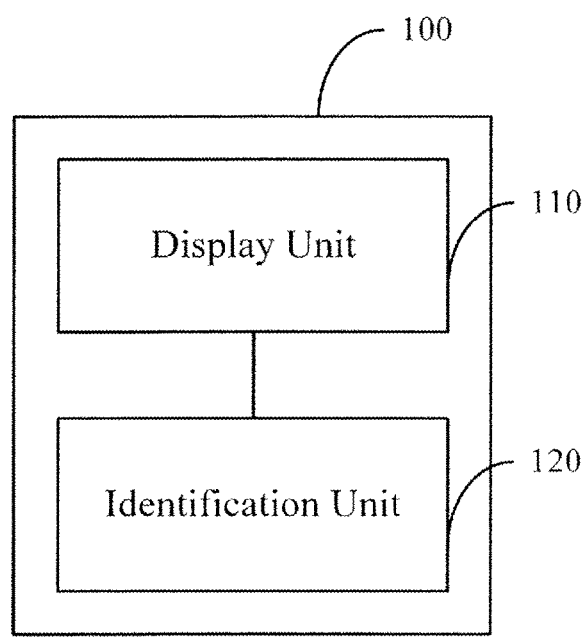
FIG. 8 shows a specific block diagram of an information obtainment module in the system illustrated in FIG. 7.

Furthermore, as shown in FIG. 8, the information obtainment module 100 specifically comprises;

a display unit 110, configured to display the data in each mobile apparatus by means of display modules on the display interface of the endpoint PC after the endpoint PC has obtained the data in the each mobile apparatus, and it is one-to-one correspondence among the mobile apparatuses and the display modules;

an identification unit 120, configured to indicate the name of the each mobile apparatus in the display modules.

Furthermore, the information transfer module 200 includes:

a movement unit, configured to determine whether a format of the data in a designated mobile apparatus to be transferred is different from that of the data in a destination mobile apparatus when the instruction for data transfer is received, and if the two formats have a difference, convert the format of the data in the designated mobile apparatus into a saved format in the destination mobile apparatus as well as transfer and import the format-converted data into the destination mobile apparatus.

Furthermore, the information transfer module 200 includes:

a synchronization unit, configured to determine whether a format of the data in the designated mobile apparatus to be synchronized is different from that of the data in the destination mobile apparatus when the instruction for data synchronization is received. If the two formats have a difference, the format in the designated mobile apparatus is converted into the saved format in the destination mobile apparatus. Then, the duplicate data is filtered out and the filtered data is imported into the destination mobile apparatus.

Furthermore, the aforementioned data includes multimedia, contacts, and SD card documents. Technical details about the above units of modules have been described in the preceding method, and they will not be repeated here.

In summary, the present invention employs an endpoint PC which is simultaneously connected with multiple mobile apparatuses to obtain data in each mobile apparatus, and according to an instruction for data transfer or an instruction for data synchronization operated by an user, the data in a designated mobile apparatus is transferred to or synchronized with a destination mobile apparatus to carry out information transfer and sharing among multiple mobile apparatuses.

If should be understood that this invention is not limited to the foregoing description of the disclosed embodiments. Various changes and modifications can be made to the invention in light of the above detailed description by those skilled in the art. These changes and modifications are possible within the scope of the invention as defined by the following claims.

What is claimed is:

1. A method of information transferring between at least a first mobile apparatus and a second mobile apparatus using an endpoint PC, the method comprising:

detecting an electronic connection of the first mobile apparatus or the second mobile apparatus to the endpoint PC;

identifying first data in the first mobile apparatus and second data in the second mobile apparatus;

obtaining, using the endpoint PC, the first data from the first mobile apparatus, the second data from the second mobile apparatus, a name of the first mobile apparatus, and a name of the second mobile apparatus;

saving the first data, the second data, a name of the first mobile apparatus, and a name of the second mobile apparatus in the endpoint PC;

indicating, using the endpoint PC, the name of the first mobile apparatus with a model number and the name of the second mobile apparatus with a model number;

displaying at least one of the first data and the second data, displaying the name of the first mobile apparatus, and the name of the second mobile apparatus on a display module of the endpoint PC;

comparing, using the endpoint PC, a format of the first data with a format of the second data, wherein in response to the format of the first data is not same as the format of the second data, converting, using the endpoint PC, the format of the first data into a saved format of the second mobile apparatus;

transferring or synchronizing, over the electronic connection, the first data and the second data between the first mobile apparatus and the second mobile apparatus; and comparing, using the endpoint PC, the first data with the second data, and reminding a user to transfer or synchronize the first data and the second data between the first mobile apparatus and the second mobile apparatus if the first data is not same as the second data.

2. The method of information transferring according to claim 1, wherein the electronic connection of the first mobile apparatus or the second apparatus to the endpoint PC is over a wired connection or over a wireless connection.

3. The method of information transferring according to claim 1, wherein the data comprises multimedia, contacts, and SD card documents.

4. A method of information transferring between at least a first mobile apparatus and a second mobile apparatus using an endpoint PC, the method comprising:

detecting an electronic connection of the first mobile apparatus or the second mobile apparatus to the endpoint PC;

identifying first data in the first mobile apparatus and second data in the second mobile apparatus;

obtaining, using the endpoint PC, the first data from the first mobile apparatus, the second data from the second mobile apparatus, a name of the first mobile apparatus, and a name of the second mobile apparatus; saving the first data, the second data, a name of the first mobile apparatus, and a name of the second mobile apparatus in the endpoint PC;

indicating, using the endpoint PC, the name of the first mobile apparatus with a model number and the name of the second mobile apparatus with a model number;

displaying at least one of the first data and the second data, displaying the name of the first mobile apparatus, and the name of the second mobile apparatus on a display module of the endpoint PC;

comparing, using the endpoint PC, a format of the first data with a format of the second data, wherein in response to the format of the first data is not same as the format of the second data, converting, using the endpoint PC, the format of the first data into a saved format of the second mobile apparatus;

transferring or synchronizing, over the electronic connection, the first data and the second data between the first mobile apparatus and the second mobile apparatus;

comparing, using the endpoint PC, the first data with the second data, and reminding a user to transfer or synchronize the first data and the second data between the first mobile apparatus and the second mobile apparatus if the first data is not same as the second data; and filtering out duplicate data from the first data having the saved format of the second mobile apparatus and importing the filtered data having the saved format of the second mobile apparatus into the second mobile apparatus.

5. The method of information transferring according to claim 4, wherein the electronic connection of the first mobile apparatus or the second apparatus to the endpoint PC is over a wired connection or over a wireless connection.

6. The method of information transferring according to claim 4, wherein the data comprises multimedia, contacts, and SD card files.

* * * * *